F. SANDERS.
PUSH BEAN HARVESTER.
APPLICATION FILED SEPT. 6, 1918.

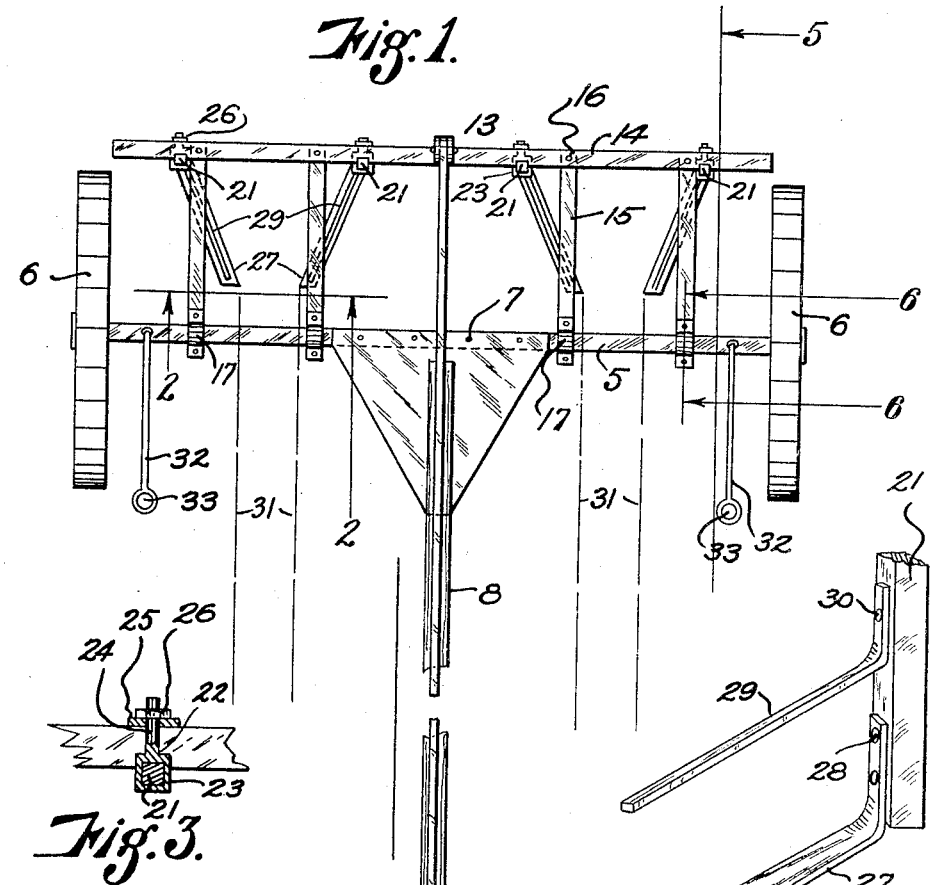
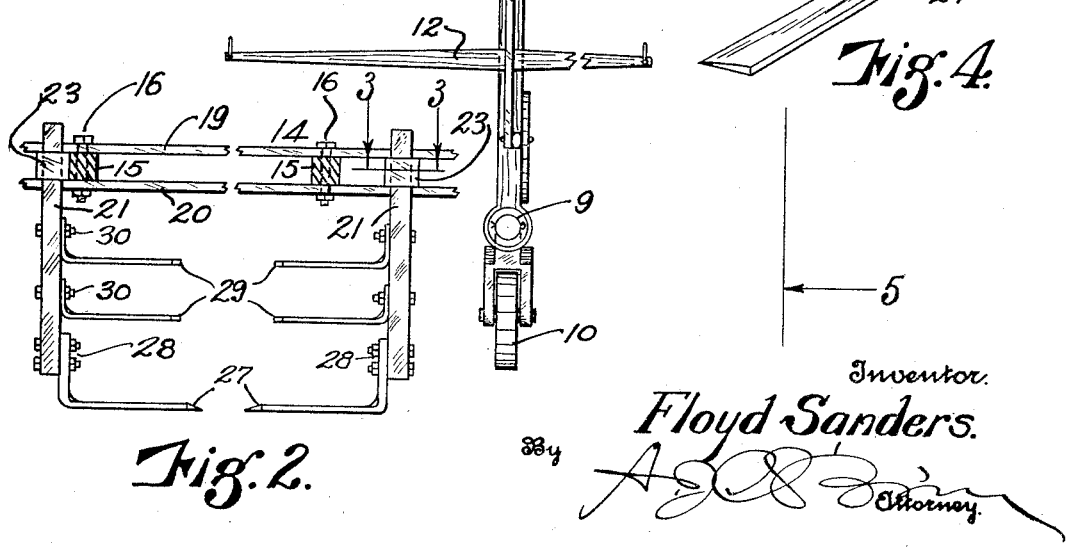

1,329,632.

Patented Feb. 3, 1920.
2 SHEETS—SHEET 2.

Inventor
Floyd Sanders.
By [signature] Attorney

UNITED STATES PATENT OFFICE.

FLOYD SANDERS, OF ROCKY FORD, COLORADO.

PUSH BEAN-HARVESTER.

1,329,632.   Specification of Letters Patent.   Patented Feb. 3, 1920.

Application filed September 6, 1918. Serial No. 252,879.

*To all whom it may concern:*

Be it known that I, FLOYD SANDERS, a citizen of the United States, residing at Rocky Ford, county of Otero, and State of Colorado, have invented certain new and useful Improvements in Push Bean-Harvesters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in bean harvesters, my object being to provide a construction of this class which shall be adapted to be moved across the field by a team of horses occupying a position in the rear of the body of the machine, whereby the latter is pushed forwardly when in use, a double-tree being properly located in the rear of the horses for the purpose, the construction and arrangement being such that the bean vines are cut and simultaneously moved into windrows, the latter being located beyond the path where the horses travel, thus making it practicable to harvest the beans without loss. The ground wheels of the body of the machine are also so arranged that they do not interfere in any way with the rows of beans.

My improved machine, as illustrated in the drawing, is adapted to simultaneously cut four rows of beans and move them into two windrows, two rows of beans on each side of the longitudinal center of the machine being collected into a single windrow.

Heretofore the harvesting of beans by a machine has been attended by a relatively large loss. Hence, one of the objects of my improvement is to overcome this difficulty. Another object is to provide a machine for economically harvesting beans. Heretofore, in order to prevent loss by the use of machines, beans have been quite generally harvested by hand, but this is comparatively expensive. By virtue of my improvement farmers may make a large saving in harvesting their beans as compared with having the work done by hand.

Having briefly outlined my invention, I will proceed to describe the same in detail, reference being made to the accompanying drawing in which is illustrated an embodiment thereof. In this drawing:

Figure 1 is a top plan view of the machine, the tongue being partly broken away.

Fig. 2 is a section taken on the line 2—2, Fig. 1, viewed in the direction of the arrows.

Fig. 3 is a section taken on the line 3—3, Fig. 2, viewed in the direction of the arrows.

Fig. 4 is a fragmentary perspective view of one of the vertically adjustable knife and windrow-finger carrying bars.

The same reference characters indicate the same parts in all the views.

Figure 5:
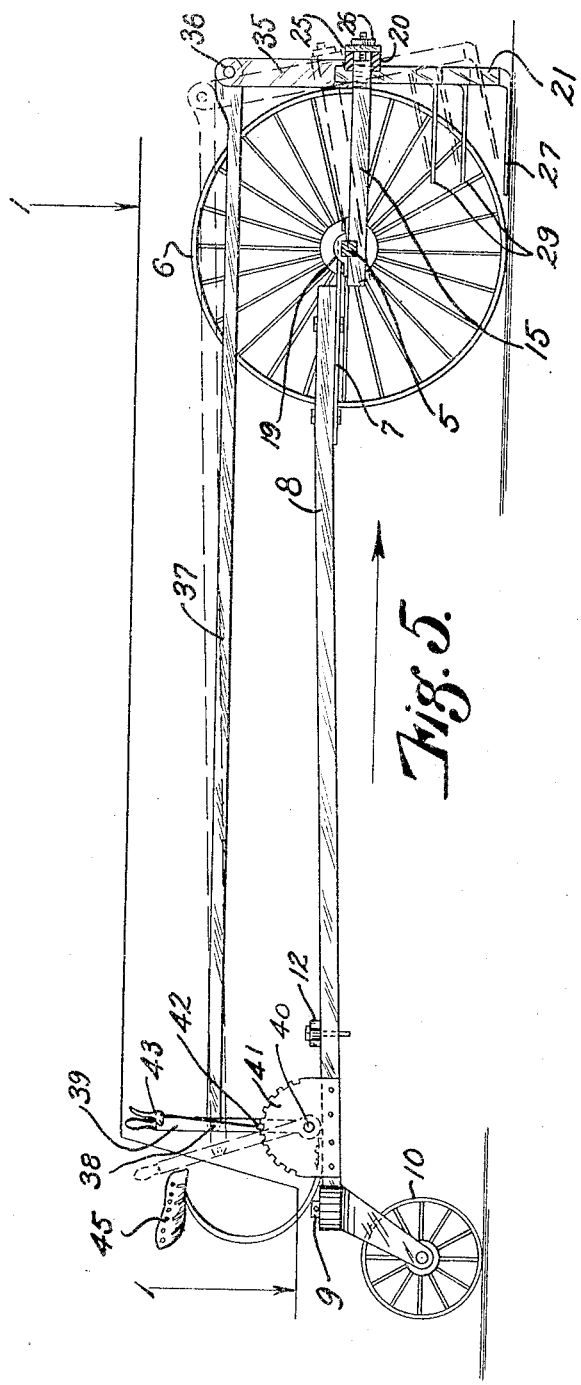
Fig. 5 is a side view of the machine being a section taken on the line 5—5, Fig. 1 looking toward the left.

Let the numeral 5 designate an axle supported by ground wheels 6 which are journaled at its outer extremities. Secured to the axle as shown at 7 is a rearwardly extending tongue 8 at whose rear extremity is journaled as shown at 9, a caster wheel 10 to facilitate the guiding and turning of the machine. Upon the tongue forward of the caster wheel is mounted a double-tree 12 with which the horses for operating the machine are connected.

Figure 6:
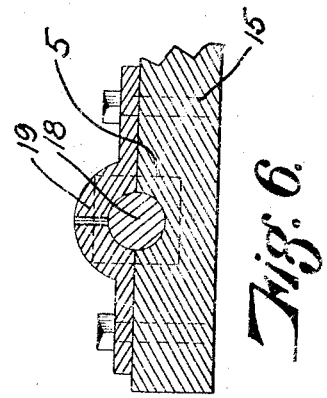
Fig. 6 is a section taken on the line 6—6, Fig. 1, the parts being shown on a larger scale.

Extending forwardly from the axle is a frame member 13 consisting of a transversely arranged bar 14 which is parallel with the axle and connected therewith by means of a series of arms 15 whose forward extremities are secured to the bar 14 as shown at 16, and whose rear extremities are journaled on the axle as shown at 17, the parts of the axle where the arms 15 are connected, being cylindrical in shape as shown at 18 (see Fig. 6). As shown in the drawing the bar 14 is composed of two parallel parts 19 and 20 between which the forward extremities of the arms pass and through which the securing devices 16 as bolts are passed. In this way the forward extremities of the arms are rigidly secured to the bar 14 while the entire structure is pivotally connected with the axle to permit vertical oscillation.

Furthermore, I mount upon the bar 14 a number of vertically adjustable members 21 which are secured to the bar 14 by clamping devices 22 consisting of hollow square ends 23 provided with forwardly extending screw-threaded stems 24 which pass through washer plates 25 and are secured by nuts 26 applied to the forward surfaces of the said plates, the plates being of such size as to bridge the space between the members 19 and 20 of the bar 14. Each fastening member 22 has its extremity 23 of such size that it can enter the space between the parts 19 and 20 of the bar, whereby when the nut 26 is adjusted, the fastening device is allowed either forward or rearward movement for purposes of adjustment. The extremities 23 of these fastening devices are open to receive the members 21 which are freely slidable vertically when the fastening device is loosened. However, when the nuts 26 are tightened, the members 21 will be clamped tightly against the bar 14.

Each member 21 carries a knife 27 which is suitably secured or connected with the member 21 as shown at 28, each knife extending rearwardly and laterally, whereby it is inclined with reference to the direction of travel so that a shearing result is obtained as the knife engages the vines of the beans or other similar crop to be harvested.

As shown in the drawing there are four of the vertically adjustable bars 21 each carrying a knife 27 and two windrow-forming fingers 29 which extend rearwardly and laterally, preferably parallel or approximately parallel with the knife, each finger being secured to the members 21 as shown at 30.

The four sets of knives and fingers are arranged in two pairs, each pair of coöperating knives and each pair of coöperating fingers extending toward each other as they extend rearwardly for the purpose of throwing the vines cut by the two knives into a windrow, the location of which is indicated by the lines 31 in Fig. 1 of the drawing.

Hence, the construction shown is adapted for havesting four rows of beans as the machine is moved across the field, the two rows on each side of the tongue being formed into a windrow through the instrumentality of the fingers 29.

The horses for operating the machine are so hitched to the double-tree 12 that they travel in paths outside of the windrows and between the windrows and the ground wheels 6. The axle is provided at each extremity thereof with a rearwardly extending rod 32 which has an eye 33 in its rear extremity with which the breast strap of one of the horses may be connected. By virtue of this arrangement each horse is kept in his proper location and prevented from traveling upon the windrow of beans. Furthermore, each horse will travel between a windrow of beans and a row of unharvested beans which is located outside of the corresponding ground wheel 6. In other words, each ground wheel 6 runs between two rows of beans, the outside row being uncut and the inside row cut as the machine is moved across the field. In this way the ground wheels and the horses are kept from interfering in any way with either the windrow of harvested beans or the adjacent row of unharvested beans. This is very important on the standpoint of economy, since there is practically no waste in harvesting the beans where my improved machine is employed.

In order to raise the knives from the ground when traveling from place to place or turning the machine at each end of the field, I connect an upright bar 35 with the bar 14 at the center of the latter. The upper extremity of the bar 35 is pivotally connected as shown at 36 with the forward extremity of a rearwardly extending rod 37 whose rear extremity is pivotally connected, as shown at 38, with an operating lever 39 which is pivotally connected as shown at 40 with a quadrant 41 which coöperates with a pawl 42 connected with a hand member 43 mounted on the lever 39 in the usual manner. The rear portion of the tongue carries a seat 43 for the driver, the lever 39 being conveniently accessible to the operator when occupying the said seat. When the rod 37 and the bar 14 together with its connections are in the full line position in Fig. 5, the machine is in position for cutting the beans and moving the vines into the windrows. When it is desired to turn the machine at the end of the field or raise the knives from their vine cutting position for any purpose, the lever arm 39 is moved to the dotted line position in Fig. 5, whereby the parts connected therewith are similarly adjusted, as best illustrated in Fig. 5.

From the foregoing description the use and operation of my improved bean harvester will be readily understood. I propose to operate the machine by a pair of horses which occupy positions on opposite sides of the tongue 8 and between the windrow locations and an adjacent row of beans, the ground wheels also occupying positions between one of the rows of beans which is harvested as the machine is moved over the field and the outside unharvested row. The horses are connected with the double-tree for draft purposes while their breast straps are connected with the rods 32, whereby they are prevented from moving out of their proper lines of travel. When the horses are in position to operate the machine they are located in the rear of the axle and are facing in the direction of the travel of the machine, the body of the machine being pushed ahead of the draft animals. As the machine is moved forwardly each knife cuts a row of beans and the two adjacent knives on each side of the machine cut two adjacent rows of beans and the fingers 29 move these beans into a single windrow. Thus, when four rows of beans are cut there is a windrow of beans on each side of the tongue of the machine.

It is evident by loosening the nuts 26 of any fastening device 22 that the corresponding member 21 together with its knife 27 and its corresponding fingers 29, may be raised and lowered at will.

What I claim is:

1. The combination of a main frame supported on ground wheels and including an axle, an auxiliary frame mounted to oscillate on the axle and being equipped with knives for cutting the crop and fingers for forming the cut crop into windrows.

2. The combination with a main frame supported by ground wheels and including the forwardly located axle, a rearwardly extending tongue, means for connecting draft animals with the vehicle on opposite sides of the tongue and in the rear of the axle, a caster wheel connected with the rear extremity of the tongue, an auxiliary frame connected with the axle to oscillate thereon and carrying knives and windrow-forming fingers.

3. A harvester of the class described comprising an axle, ground wheels supporting the axle, a tongue connected with the axle and extending rearwardly therefrom, a caster wheel supporting the rear extremity of the tongue, means for connecting draft animals to the machine on opposite sides of the tongue and in the rear of the axle, an auxiliary frame connected with the axle to oscillate thereon and carrying knives for cutting the crop, means for forming the cut crop into windrows and suitable means for manipulating the oscillatory frame substantially as described.

4. A harvester for beans and similar crops, comprising a main frame supported on wheels and including an axle, an auxiliary frame mounted to oscillate on the axle, said auxiliary frame comprising arms extending forwardly from the axle, a bar connected with the free ends of said arm, posts depending from said bar, and windrow-forming fingers and knives mounted on said posts.

5. A harvester for beans and similar crops, comprising a main frame supported on wheels and including an axle, an auxiliary frame mounted to oscillate on the axle, said auxiliary frame comprising arms extending forwardly from the axle, a bar connected with the free ends of said arm, posts depending from said bar, windrow-forming fingers and knives mounted on said posts, said posts with their accompanying knives and fingers being arranged in pairs, the parts of each pair extending rearwardly from the post and converging, draft animal attachments secured to the harvester in the rear of said auxiliary frame, said attachments and wheels being positioned so that the animals and the wheels will run between the windrows formed by the machine and adjoining rows beyond the machine.

6. A harvester for beans and similar crops, comprising a main frame supported on wheels and including an axle, an auxiliary frame mounted to oscillate on said axle and extending forwardly therefrom, devices arranged in pairs on the forward portion of said auxiliary frame, each device comprising a cutter and windrow-forming means, the devices of each pair converging as they extend rearwardly, whereby each pair forms a single windrow, draft animal attachments secured to the harvester in the rear of said auxiliary frame, said attachments and wheels being positioned so that the animals and the wheels will run between the windrows formed by the machine and adjoining rows beyond the machine.

7. A harvester for beans and similar crops, comprising a main frame supported on wheels and including an axle, an auxiliary frame mounted on said axle, devices mounted on said auxiliary frame and arranged in pairs, each device comprising a cutter and windrow-forming means, the devices of each pair converging toward each other as they extend rearwardly, whereby each pair forms a single windrow, attachments for draft animals secured to the harvester in the rear of said auxiliary frame, said attachments and wheels being positioned so that the animals and the wheels will run between the windrows formed by the machine and adjoining rows beyond the machine.

In testimony where I affix my signature.

FLOYD SANDERS.